(12) United States Patent
Shimamura et al.

(10) Patent No.: US 8,157,922 B2
(45) Date of Patent: Apr. 17, 2012

(54) APPARATUS AND METHOD FOR PROCESSING INSIDE OF PIPE

(75) Inventors: Mitsuaki Shimamura, Yokohama (JP); Yutaka Togasawa, Yokohama (JP); Takeshi Maehara, Yokohama (JP); Yasuhiro Yuguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 990 days.

(21) Appl. No.: 12/053,061

(22) Filed: Mar. 21, 2008

(65) Prior Publication Data
US 2008/0264451 A1    Oct. 30, 2008

(30) Foreign Application Priority Data
Mar. 23, 2007    (JP) ................ P2007-077028

(51) Int. Cl.
| | |
|---|---|
| *B08B 9/045* | (2006.01) |
| *B08B 13/00* | (2006.01) |
| *B23K 28/00* | (2006.01) |
| *B23K 9/00* | (2006.01) |
| *B23K 26/00* | (2006.01) |
| *B24B 7/00* | (2006.01) |

(52) U.S. Cl. ............ 134/22.11; 134/113; 134/166 C; 228/29; 219/121.6; 219/136

(58) Field of Classification Search ........... 134/22.11, 134/113, 166 R, 167 R, 168 R, 169 R, 166 C, 134/167 C, 168 C, 169 C; 219/121.6, 136; 228/29; 451/73; 72/54
See application file for complete search history.

(56) References Cited

U.S. PATENT DOCUMENTS

| | | | | | |
|---|---|---|---|---|---|
| 2,887,118 | A | * | 5/1959 | Loeffler et al. | 134/112 |
| 4,938,167 | A | * | 7/1990 | Mizuho et al. | 118/713 |
| 5,244,505 | A | * | 9/1993 | Allison et al. | 134/22.11 |
| 5,580,393 | A | * | 12/1996 | Lawther | 134/8 |
| 6,550,486 | B2 | * | 4/2003 | MacNeil et al. | 134/22.11 |
| 6,615,848 | B2 | * | 9/2003 | Coats | 134/22.11 |
| 7,017,593 | B2 | * | 3/2006 | Honda | 134/22.11 |
| 2004/0099293 | A1 | * | 5/2004 | MacNeil et al. | 134/167 C |
| 2006/0243303 | A1 | * | 11/2006 | Harr | 134/6 |

FOREIGN PATENT DOCUMENTS
JP    2006055723 A    *    3/2006

OTHER PUBLICATIONS
Machine Translation of JP 2006055723 A to Abe, Mar. 2006.*

* cited by examiner

*Primary Examiner* — Michael Barr
*Assistant Examiner* — Benjamin Osterhout
(74) *Attorney, Agent, or Firm* — Oblon, Spivak, McClelland, Maier & Neustadt, L.L.P.

(57) ABSTRACT

An apparatus for processing an inside of a pipe which performs various works from an inside of a pipe, includes traveling drive units, a working device, rotation support mechanisms, a coupling mechanism, and suspension devices. The traveling drive units are inserted into the inside of the pipe, and the working device is moved in a circumferential direction along the inside of the pipe by the traveling drive units.

13 Claims, 10 Drawing Sheets

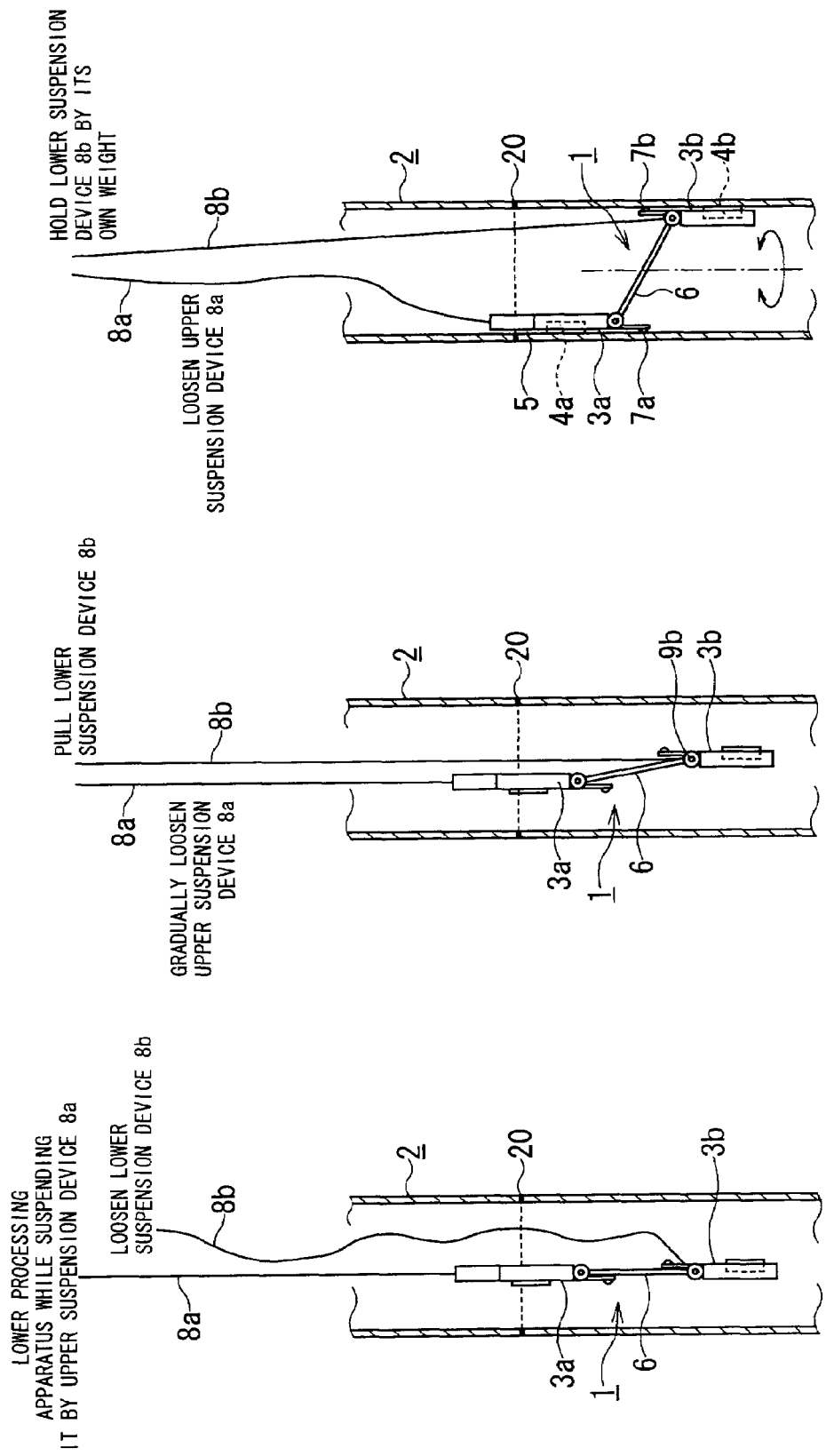

APPARATUS AND METHOD FOR PROCESSING INSIDE OF PIPE

BACKGROUND OF THE INVENTION

1. Field of the Invention

The present invention relates to an apparatus for processing an inside of pipe and a method of processing an inside of pipe for performing works such as rinse, inspection, examination, preventive maintenance, repair, and the like of an inside of a pipe, and, more particularly, to an apparatus and method for processing an inside of pipe for performing necessary works such as rinse, inspection, examination, preventive maintenance, repair, and the like of an inside of a pipe with respect to a welding line of a jet pump installed in a pressure vessel of a boiling water reactor.

2. Related Art

Works such as rinse, inspection, examination, preventive maintenance, repair, and the like of an inside of a pipe in a jet pump installed in a pressure vessel of a boiling water reactor must be performed under radiation environmental conditions. Further, since a person cannot access the pipe and a working environment cannot be secured, there is proposed a system (inspection without disassembly) for performing inspection and examination works by inserting a pipe inside processing apparatus into the pipe without removing an inlet mixer of the jet pump to reduce man-hour and working time.

Most of known technologies employ pipe inside processing apparatus, which have a structure for fixing the apparatus and hold them on an inside of a pipe by a plurality of arms that can be developed in a radial direction, and also employ pipe inside processing methods using the apparatus.

As an example of such apparatus for inspecting and examining an inside of the jet pump, there is proposed a pipe inside processing apparatus, which has a slender casing and the position of the apparatus is held in a pipe by developing a plurality of arms from the apparatus in a radial direction, and further a pipe inside processing method using the apparatus (refer to, for example, Patent document 1: Japanese Unexamined Patent Application Publications No. 2001-281386 and Patent document 2: Japanese Unexamined Patent Application Publication No. 2001-159696).

The Patent Document 1 employs a structure for developing a pair of arms driven by an air cylinder in an inside of a pipe to position a work unit composed to a pipe inside scraper and a suction port.

Further, the Patent Document 2 fixes a pipe inside processing apparatus by developing three arms driven by an air cylinder to position the processing apparatus in the inside of the pipe. Then, the processing apparatus is moved to and held by the inside of the pipe by a link mechanism and an articulated arm disposed to a lower portion of the apparatus.

Further, a Patent Document 3 (Japanese Unexamined Patent Application Publication No. 2001-65778) proposes a pipe inside processing apparatus for holding the position of arms in a pipe by develop a plurality of guide arms from a slender casing in a radial direction. In the example, the guide arms are developed and fixed in three directions in an inside of a pipe by disposing detectors to the extreme ends of three legs developed mechanically. Thereafter, the processing apparatus is rotated in the inside of the pipe using a cable as a fixing side. Further, a weight is coupled with a lower end of the apparatus to stabilize the position thereof and can be disposed in parallel with the center axis of the apparatus.

As described above, almost all the structures for fixing the pipe inside processing apparatuses to the inside of the pipe fix the processing apparatuses by pressing them against the inside of the pipe by developing a plurality of arms in a radial direction.

In the pipe inside processing apparatus having the fixing structure as described above, when the extreme ends of the plurality of arms are inclined because the normal line of a plane, including the points at which the extreme ends of the plurality of arms come into contact with the inside of the pipe, becomes out of parallel with the axis center of the pipe, the rotation surface of an inspection sensor along the circumferential direction of the pipe is offset obliquely, and the sensor is offset from a horizontal welding line. Accordingly, there arises a problem in that the inspection sensor cannot perform desired inspection and examination.

Further, when the pipe inside processing apparatus is raised or lowered in its entirety to correct the offset center axis thereof, the relative up/down positions of the pipe and the inside of pipe processing apparatus may be offset from each other or the inspection sensor may be offset from the horizontal welding line. Accordingly, it cannot perform desired inspection and examination. Since it is necessary for an articulated arm having a multiplicity of degrees of freedom to correct the offset amount and to move the inspection sensor in the circumferential direction along the inside of the pipe, the structure of the processing apparatus is made complex and the size thereof is increased. Thus, there arises a problem in that the apparatus cannot pass through the opening between a nozzle and a throat of the jet pump.

Furthermore, when the number of parts of the pipe inside processing apparatus is increased, there is a tendency that a risk of occurrence of failure also increases. As a result, there is an increased risk that the arm cannot be closed because the pipe inside processing apparatus fails and cannot be collected from the opening between a nozzle and a throat of the jet pump. Further, even if the processing apparatus can be collected, there is a high possibility of damaging the nozzle and the throat of the jet pump.

SUMMARY OF THE INVENTION

An object of the present invention, which was made to solve the problems described above, is to provide an inside of pipe processing apparatus, which has a simple arrangement and a simple construction, can move in an inside of a pipe accurately and correctly without removing the pipe, can safely and securely perform works such as rinse, inspection, examination, planning maintenance, repair, and the like without damaging the pipe, and an inside of pipe processing method.

Another object of the present invention is to provide an inside of pipe processing apparatus, which does not damage a pipe in works such as rinse, inspection, examination, planning maintenance, repair, and the like without causing a worker to access an inside of the pipe in which a work environment is bad and the mounting/dismounting work of which to the pipe and the collection work of which from the pipe can be safely and easily performed, and an inside of pipe processing method.

To achieve the above objects, the present invention provides, in one aspect, an apparatus for processing an inside of a vertical pipe, comprising:

two traveling drive units disposed to be movable in contact with the inside of the pipe;

a working device disposed to at least one of the traveling drive units for processing an inside of pipe;

a rotation support mechanism rotatably disposed to the traveling drive units;

a coupling mechanism for swingably coupling the two traveling drive units, respectively, through the rotation support mechanism, the coupling mechanism having such a length that a relative distance between the contact points of the two traveling drive units is larger than the inner diameter of the vertical pipe; and two suspension devices connected to the rotation support mechanism of one of the traveling drive units and to the rotation support mechanism of the other of the traveling drive units, wherein the two traveling drive units are inserted into the inside of the pipe, and the working device is moved in a circumferential direction along the inside of the pipe by the two traveling drive units.

In another aspect of the present invention, there is also provided an apparatus for processing an inside of a vertical pipe, comprising:

three or more traveling drive units disposed to be movable in contact with the inside of the pipe;

a working device disposed to at least one of the traveling drive units for processing the inside of the pipe;

a rotation support mechanism rotatably disposed to the traveling drive units;

a coupling mechanism for swingably coupling the traveling drive units through the rotation support mechanism and connecting all the traveling drive units; and a suspension device connected to the rotation support mechanism disposed to the traveling drive unit located at one end and to the rotation support mechanism disposed to the traveling drive unit located at another end of the traveling drive units coupled by the coupling mechanism, wherein the coupling mechanism has a length set such that a polygonal shape, which is drawn on a projection plane approximately orthogonal to the center axis of the pipe in the longitudinal direction thereof by the contact point, which is located on the inside of the pipe, of the traveling drive unit includes a center point of the pipe on the projection plane; and the traveling drive units are inserted into the inside of the pipe, and the working device is moved in a circumferential direction along the inside of the vertical pipe by the traveling drive units.

In a further aspect of the present invention, there is also provided an apparatus for processing an inside of a horizontal pipe, comprising:

three or more traveling drive units disposed to be movable in contact with the inside of the pipe;

a working device disposed to at least one of the traveling drive units for performing a work;

a rotation support mechanism rotatably disposed to the traveling drive units;

a coupling mechanism for swingably coupling each two of the traveling drive units through the rotation support mechanism and connecting all the traveling drive units, wherein the coupling mechanism has a length set such that a polygonal shape, which is drawn on a projection plane approximately orthogonal to the center axis of the pipe in a longitudinal direction thereof by the contact point, which is located on the inside of the pipe, of the traveling drive unit includes a center point of the pipe on the projection plane, and the working device is moved in a circumferential direction along the inside of the horizontal pipe by the traveling drive units.

According to the present invention, in the further aspect, there is provided a method of processing an inside of a pipe comprising:

a preparation step of preparing the pipe inside processing apparatus mentioned hereinabove;

a fixing step of fixing the processing apparatus in a vicinity of a target portion of the pipe; and a working step of performing a work to the target portion.

According to the present invention, there can be provided the pipe inside processing apparatus, which has the simple arrangement and the simple construction, can accurately and correctly move in the inside of the pipe without removing the pipe, and can safely and securely perform the works such as rinse, inspection, examination, protective maintenance, repair and the like without damaging the pipe, and there can be also provided a pipe inside processing method.

Further, there can be provided the pipe inside processing apparatus, which does not damage a pipe in works such as rinse, inspection, examination, protective maintenance, repair, and the like without causing a worker to access an inside of the pipe in which a work environment is bad and the mounting or dismounting work of which to the pipe and the collection work of which from the pipe can be safely and easily performed, and also provided an pipe inside processing method.

BRIEF DESCRIPTION OF THE DRAWINGS

FIGS. 2A, 2B and 2C are conceptual views showing installation procedures of the first embodiment of the pipe inside processing apparatus according to the present invention:

DESCRIPTION OF THE PREFERRED EMBODIMENTS

Hereunder, embodiments of the present invention will be explained with reference to the accompanying drawings.

First Embodiment

A first embodiment of an apparatus 1 for processing an inside of a pipe (called pipe inside processing apparatus, hereinafter) according to the present invention will be explained referring to FIGS. 1 to FIG. 5.

Figure 1A:
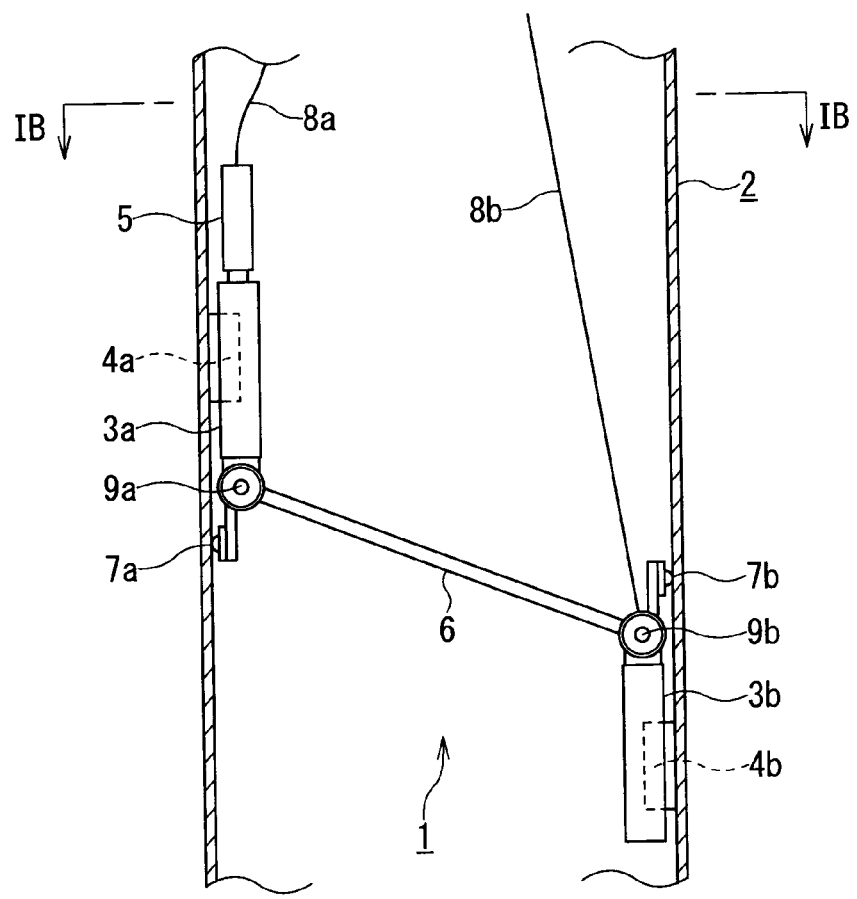
FIG. 1A is a longitudinal sectional view and FIG. 1B is a plan view, which show arrangement and shape of a first embodiment of an apparatus for processing an inside of a pipe (pipe inside processing apparatus hereinafter) according to the present invention.

As shown in FIG. 1A, the pipe inside processing apparatus 1 of the first embodiment includes: traveling drive units 3a, 3b, which have traveling wheels 4a, 4b, respectively and move in a circumferential direction on an inside of a pipe (vertical pipe) 2 disposed such that the center axis thereof faces an approximately vertical direction; a working device 5 such as a phased array UT probe and the like which can search a crack in the pipe by an ultrasonic wave by, for example, a non-contact manner; a rotation support mechanism 9a disposed to the traveling drive units 3a; a rotation support mechanism 9b provided for the traveling drive units 3b; a coupling mechanism 6, which couples the traveling drive units 3a, 3b corresponding to each other so as to swing through the rotation support mechanisms 9a, 9b, respectively, in addition that the relative distance between the contact point on the inside of the pipe of the traveling wheels 4a, 4b is made larger than the inner diameter of the vertical pipe 2; a suspension device 8a connected to any one of the traveling drive units 3a or the working device 5; a suspension device 8b connected to any one of the traveling drive units 3b or the rotation support mechanism 9b; an idler roller ball 7a supported by the traveling drive units 3a; and an idler roller ball 7b supported by the traveling drive units 3b.

The rotation axes of the traveling wheels 4a, 4b are approximately in parallel with the center axis of the pipe in the longitudinal direction thereof.

The rotation axes of the rotation support mechanisms 9a, 9b are approximately in parallel with a plane which is approximately orthogonal perpendicular to the center axis of the pipe in the longitudinal direction thereof.

The inner product of the unit vector of the traveling wheels 4a, 4b in the rotation axis direction thereof and the inner product of the unit vector of the rotation support mechanisms 9a, 9b in the rotation axis direction thereof are set to zero (0).

The pressure force of the idler roller balls 7a, 7b is balanced with the horizontal force acting on the rotation support mechanisms 9a, 9b and the couple of the traveling drive units 3a, 3b generated by the ground contact force of the traveling wheels 4a, 4b.

Accordingly, when the positions of the rotation support mechanisms 9a, 9b disposed to the traveling drive units 3a, 3b are set to the positions where the couple of the traveling drive units 3a, 3b is not generated, it is not necessary to locate the idler roller balls 7a, 7b.

Further, the working device 5 may be attached to the traveling drive unit 3b in place of the traveling drive unit 3a. Since the traveling drive units 3a and 3b, the traveling wheels 4a and 4b, the rotation support mechanisms 9a and 9b, the suspension devices 8a and 8b, and the idler roller balls 7a and 7b have the same structure, respectively, the upper side and the lower side of the pipe inside processing apparatus 1 can be disposed upside down.

Figure 1B:
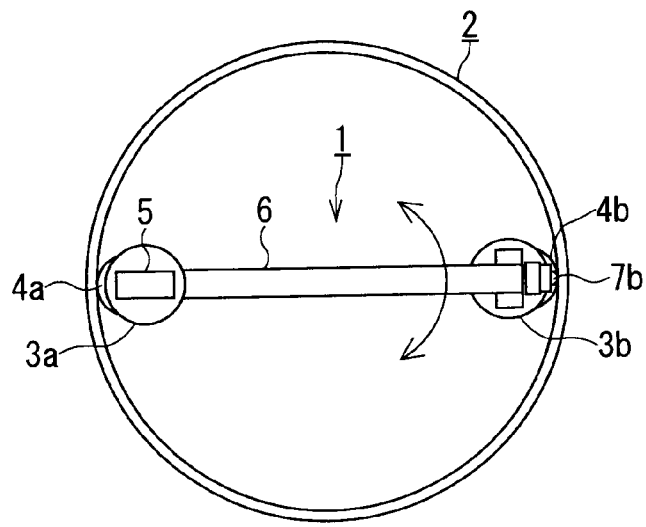

As shown in FIG. 1B, the traveling drive units 3a, 3b are installed at the most apart positions on a projection plane which is approximately orthogonal to the center axis of the pipe in the longer direction thereof, and the contact points of the respective traveling wheels 4a, 4b disposed to the traveling drive units 3a, 3b with the vertical pipe 2 are located at point symmetrical positions on the projection plane which is approximately orthogonal to the center axis of the pipe in the longitudinal direction thereof. To explain more simply, when viewed from the longitudinal direction of the pipe, the traveling drive units 3a, 3b (the traveling wheels 4a, 4b) may be located at point symmetrical positions with respect to the center axis of the pipe.

As shown in FIG. 1, when the pipe inside processing apparatus 1 is developed in the inside of the vertical pipe 2, since the vertical component of the weight under water of the processing apparatus 1 is supported by the suspension device 8b, the apparatus 1 rests in the vertical pipe 2. Under the state, when the traveling wheels 4a, 4b are driven in rotation, the traveling drive units 3a, 3b are moved in the circumferential direction on the inside of the pipe. That is, the pipe inside processing apparatus 1 is rotated using the center axis of the pipe 2 in the longitudinal direction as a center of rotation.

It is to be noted that the pipe inside processing apparatus 1 may be provided with functions as a rinse device for removing water scales, an inspection device, a planning maintenance device, and a repair device by replacing an inspection sensor 5, or the processing apparatus 1 dedicated for various types of works (rinse, inspection, examination, protective maintenance, repairing) may be separately prepared.

Hereunder, a basic structure and an operation method for mounting the pipe inside processing apparatus 1 to a submerged vertical pipe will be explained.

FIGS. 2A to 2C are conceptual views showing an installation procedure of the pipe inside processing apparatus of the first embodiment according to the present invention.

When the processing apparatus 1 is developed in the inside of the vertical pipe 2 in the embodiment, the lower suspension device 8b is first loosened so that the traveling drive units 3a is located above and the traveling drive units 3b is located below, and the pipe inside processing apparatus 1 is suspended by the upper suspension device 8a.

With this operation, the processing apparatus 1 is suspended straight in its entirety with the upper traveling drive units 3a, the coupling mechanism 6, and the lower traveling drive units 3b being suspended through the rotation support mechanisms 9a, 9b as shown in FIG. 2A.

In this state, the processing apparatus 1 is inserted into the inside of the vertical pipe 2 while being suspended from the upper portion of the pipe. The structure, which is constructed by assembling the traveling drive units 3b, the traveling wheel 4b, the rotation support mechanism 9b, and the idler roller ball 7b and is positioned to a lower side when suspended, is arranged such that the center of gravity and the center of gravity under water of the component are located below the center of the rotation axis of the rotation support mechanism.

Next, when the lower suspension device 8b is pulled by gradually loosening the upper suspension device 8a as shown in FIG. 2B, the coupling mechanism 6 is fallen down by the weight under water of the upper traveling drive units 3a and the coupling mechanism 6, so that the traveling drive units 3a, 3b are developed in directions so as to approach the inside of the pipe. At this time, the inspection sensor 5 is disposed on, for example, a welding line 20 of the vertical pipe 2 as an inspection target position.

When the overall weight of the inside of pipe processing apparatus 1 is held by the upper suspension device 8 by loosening the lower suspension device 8b as shown in FIG. 2C, the traveling wheel 4a and the idler roller ball 7a are pressed against the inside surface of the vertical pipe 2 by the horizontal force generated by the weight under water of the upper traveling drive units 3a and the coupling mechanism 6.

The traveling wheel 4b and the idler roller ball 7b are also pressed against the inside surface of the vertical pipe 2 by the reaction force resulting from the horizontal force.

The position of the pipe inside processing apparatus 1 in the longitudinal direction of the pipe is held in the lower suspension device 8b.

When the traveling wheels 4a, 4b are driven to be rotated in this state, the processing apparatus 1 is rotated about the center axis of the vertical pipe 2 in the longitudinal direction thereof shown by dot-an-chain line in FIG. 2C, thereby moving the working device 5 in the circumferential direction along the inside of the pipe.

When the pipe inside processing apparatus 1 is collected from the vertical pipe 2, the processing apparatus 1 is pulled up in its entirety by the suspension device 8a. As a result, since the processing apparatus 1 is suspended straight in its entirety naturally by the weight under water thereof, the processing apparatus 1 can be easily collected.

The principle why the grounding force acting on the traveling wheels 4a, 4b of the processing apparatus 1 is generated will be explained hereunder.

Figure 3:
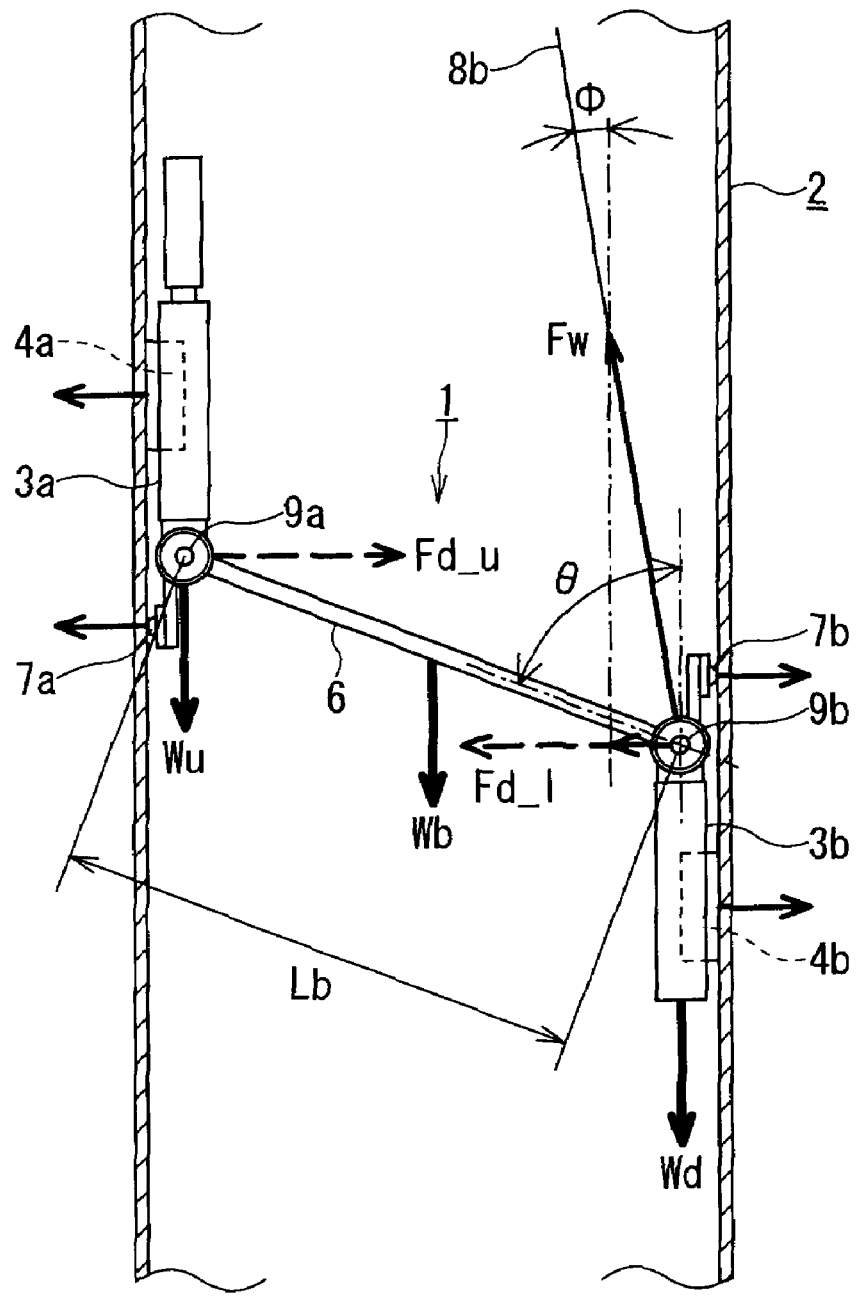
FIG. 3 is a conceptual view showing a state of force acting on the pipe inside processing apparatus of the first embodiment according to the present invention.

FIG. 3 is a conceptual view showing a state of force acting on the pipe inside processing apparatus of the first embodiment according to the present invention.

With reference to FIG. 3, it is assumed that the overall weight under water of the processing apparatus 1 is supported by the suspension device 8b.

Wu: weight under water of traveling drive unit 3a
Wd: weight under water of traveling drive unit 3b
Wb: weight under water of coupling mechanism 6
Lb: distance between rotation support mechanisms 9a and 9b disposed to traveling drive units 3a and 3b
Fw: tension of suspension device 8b
θ: angle between coupling mechanism 6 and axis center of pipe (vertical axis)
φ: angle between suspension device 8b and axis center of pipe (vertical axis)
Fd_u: horizontal force acting on rotation support mechanism 9a disposed to traveling drive unit 3a
Fd_l: horizontal force acting on rotation support mechanism 9b disposed to traveling drive unit 3b

In the above assumption, when the respective parameters are defined as shown above, the following Expression 1 is obtained from the balance of the horizontal forces received by the coupling mechanism 6 on the condition that the weights under water of the working device 5, the idler roller balls 7a, 7b, and the like are not taken into consideration.

$$Fd\_u - Fw \times \sin\phi - Fd\_l = 0 \quad (1)$$

The following Expression 2 is obtained from the balance of vertical forces.

$$Fw \times \cos\phi - Wu - Wd - Wb = 0 \quad (2)$$

The following Expression 3 is obtained from the balance of moments about the rotation support mechanism 9b.

$$Wu \times Lb \times \sin\theta + Wb \times Lb/2 \times \sin\theta - Fd\_u \times Lb \times \cos\theta = 0 \quad (3)$$

Further, the following Expressions (4) are obtained from these expressions.

$$Fd\_u = (Wu + Wb/2) \times \tan\theta$$

$$Fw = (Wu + Wd + Wb)/\cos\phi$$

$$Fd\_l = Fd\_u - Fw \times \sin\phi \quad (4)$$

It can be found from the above Expressions that the weights under water of the traveling drive unit 3a and the coupling mechanism 6 are converted into the horizontal force acting on the rotation support mechanism 9a and that the horizontal force acting on the rotation support mechanism 9b is created from the balance between the reaction force resulting from the above horizontal force and the tension of the suspension device 8b.

The resultant force of the reaction forces received by the traveling wheel 4a and the idler roller ball 7a is the horizontal force acting on the rotation support mechanism 9a, and the resultant force of the reaction forces received by the traveling wheel 4b and the idler roller ball 7b is the horizontal force acting on the rotation support mechanism 9b likewise. That is, the grounding force of the traveling wheel 4a is obtained as a part of the reaction force of the horizontal force acting on the rotation support mechanism 9a, and the grounding force of the traveling wheel 4b is obtained as a part of the reaction force of the horizontal force acting on the rotation support mechanism 9b likewise.

Hereunder, there will be explained a device and a method for improving the handling property of the pipe inside processing apparatus 1 under water.

First, a float, not shown, for obtaining buoyancy by injecting gas thereinto is attached to the traveling drive unit 3a and the inspection sensor 5 to thereby improve the handling performance at the time of lowering the pipe inside processing apparatus 1.

When the processing apparatus 1 is suspended downward, gas is injected into a float to increase inner volume to thereby generate buoyancy, thus reducing the weight in water of the processing apparatus to thereby improve the handling property of the processing apparatus 1.

When the pipe inside processing apparatus 1 is installed, the volume of the float is reduced by discharging the gas in the float by an external water pressure by reducing the pressure applied to the gas from the float so that the float loses the buoyancy and the weight under water of the traveling drive unit 3a is increased. As a result, the weight under water of the traveling drive unit 3a necessary to the grounding force of the traveling wheels 4a, 4b is not sacrificed. That is, the handling property of the pipe inside processing apparatus 1 under water can be improved.

Second, it is possible to improve the handling property when the pipe inside processing apparatus 1 is lowered while being suspended by attaching the float to the suspension device 8a.

When the pipe inside processing apparatus 1 is lowered while being suspended, it is made easy to handle the processing apparatus 1 by reducing the weight under water thereof by generating the buoyancy to the float by increasing the volume of the float by injecting gas thereinto.

When the pipe inside processing apparatus 1 is installed, the volume of the float is reduced by discharging the gas in the float by the external water pressure by reducing the pressure applied to the gas from the float so that the float loses the buoyancy and the weight under water of the traveling drive unit 3a is increased. As a result, the weight under water of the traveling drive unit 3a necessary to the grounding force of the traveling wheels 4a, 4b is not sacrificed. That is, the handling property of the inside of pipe processing apparatus 1 under water can be improved.

Next, when a welding line in a jet pump disposed in a pressure vessel of a boiling water reactor is inspected and examined, the pipe inside processing apparatus 1 is installed by a method of inserting the processing apparatus 1 into an inlet pipe of the jet pump from a portion between a nozzle and a throat of the jet pump. The method will be specifically explained below.

Figure 4:
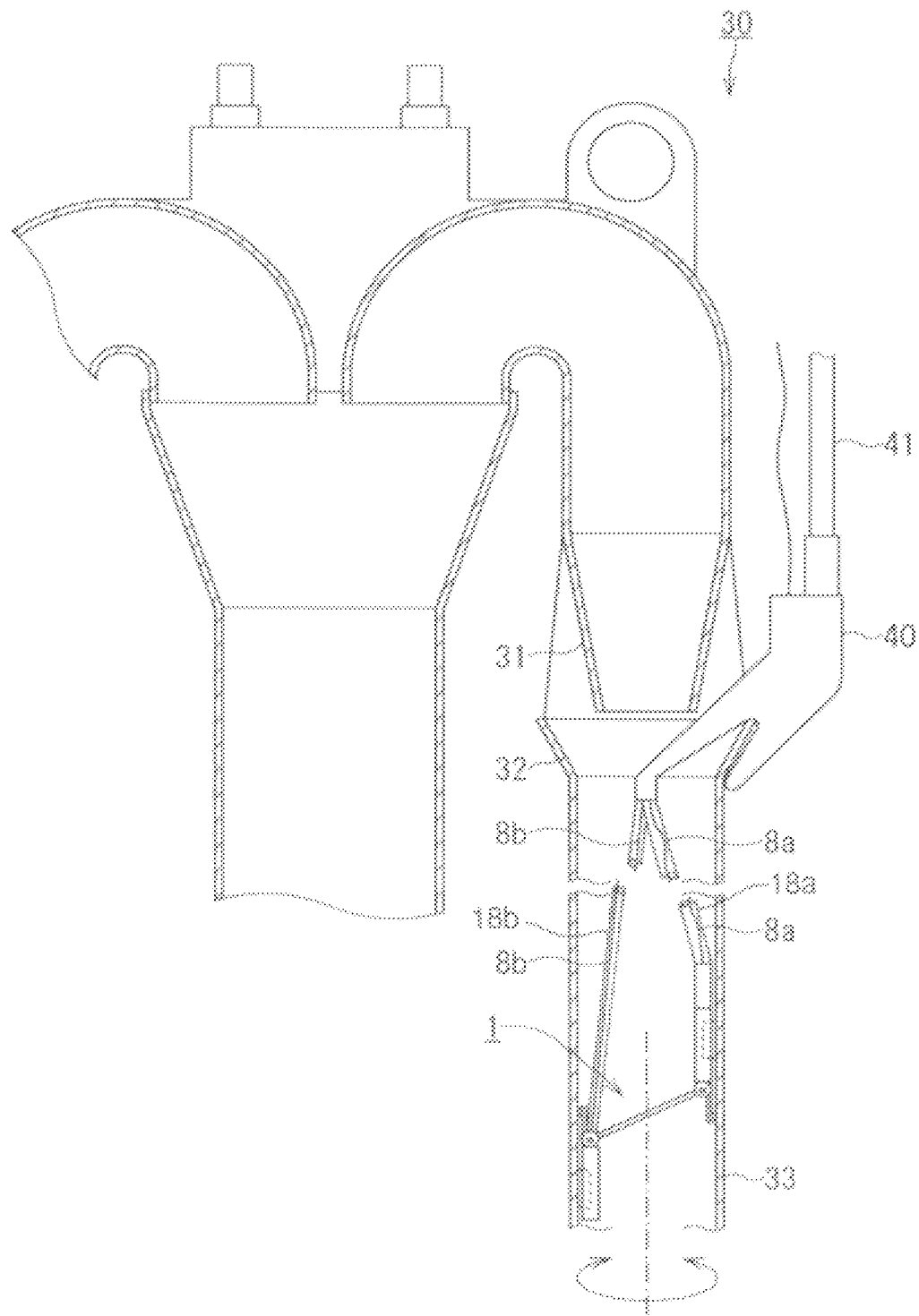
FIG. 4 is a conceptual view showing how the first embodiment of the pipe inside processing apparatus according to the present invention is applied in an inlet mixer of a jet pump.

FIG. 4 is a conceptual view showing how the pipe inside processing apparatus 1 of the first embodiment of the present invention is applied to an inlet mixer 33 of the jet pump 30.

As shown in FIG. 4, the processing apparatus 1 is attached in a suspension device guide 40 attached to the extreme end of an long (for example, about ten meters to ten and several meters) operation pole 41 through the suspension devices 8a and 8b.

The operation pole 41 is supported by the extreme end of the throat 32 through the suspension device guide 40, and the upper end of the suspension device 8b, which supports the weight and the weight under water of the processing apparatus 1, is disposed on approximately the center axis of the pipe 2 in the longitudinal direction thereof.

Then, a method of determining the initial positions of the traveling drive units 3a, 3b when the pipe inside processing apparatus 1 is installed will be explained.

Figure 5A:
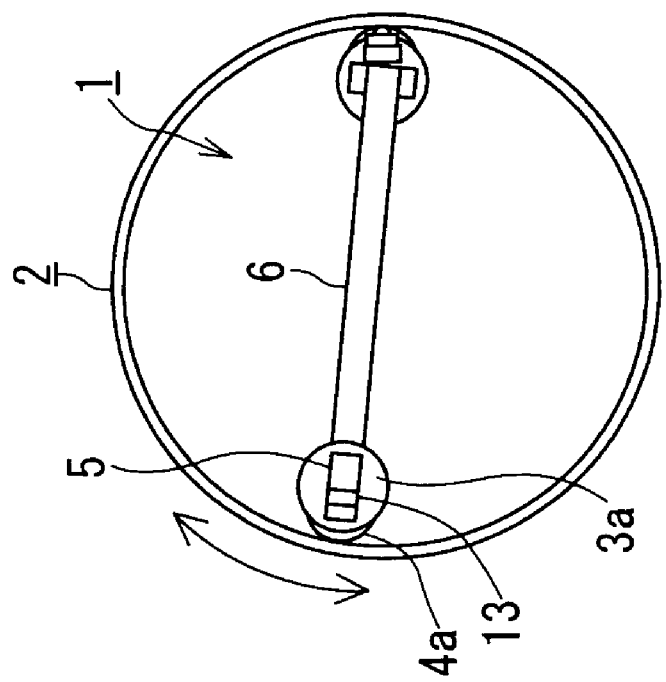
FIGS. 5A and 5B are plan views showing the first embodiment of the pipe inside processing apparatus according to the present invention for explaining a method of determining an initial position of the pipe inside processing apparatus.
Figure 5B:
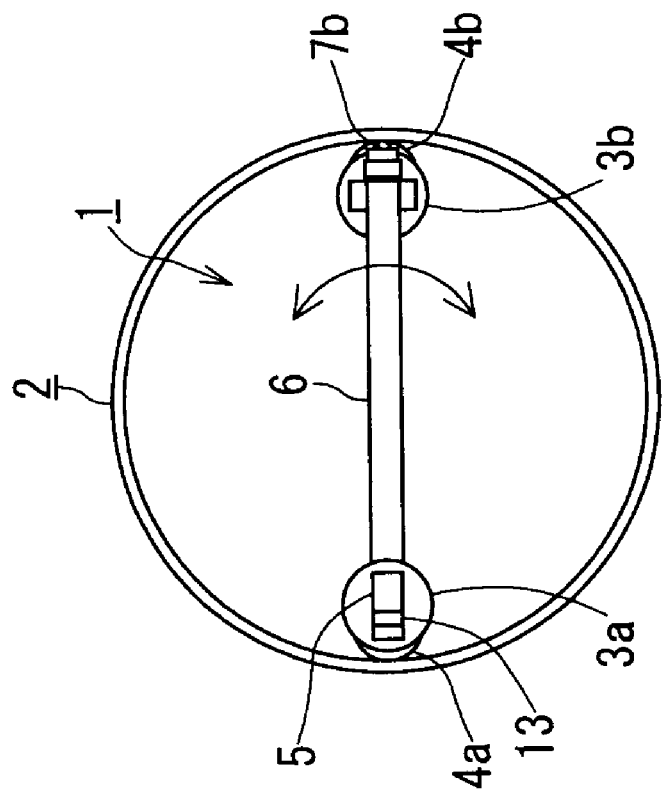

FIGS. 5A and 5B are plan views explaining a method of determining the initial position of the processing apparatus of the first embodiment according to the present invention.

FIGS. 5A and 5B are schematic views showing how the pipe processing apparatus 1 is installed when it is observed from an upper portion of the pipe.

As shown in FIG. 5B, the pipe inside processing apparatus 1 is installed such that the contact points at which the traveling wheels 4a, 4b are in contact with each other on the inside of the pipe are point-symmetrical with respect to the projection plane which is approximately orthogonal to the center axis of the pipe in the longitudinal direction thereof.

However, actually, it can be easily contemplated that the pipe inside processing apparatus 1 is installed obliquely when viewed on the plan view as shown in FIG. 5A. When the processing apparatus 1 is installed obliquely when viewed on the plan view as shown in FIG. 5A, since the working device 5 does not properly face the inside of the pipe, correct examination data cannot be obtained. Further, when pipe inside processing apparatus 1 is rotated in this state, the grounding force of the traveling wheels 4a, 4b is not stabilized due to the downward offset of the traveling wheel 4a and the like, thus giving a fear that a rotating operation is made unstable.

To cope with the this fear, an ultrasonic distance sensor 13 is disposed to, for example, an upper portion of the working device 5 as shown in FIG. 5B and measures the distance up to the inside of the pipe 2 in the direction in which the coupling mechanism 6 falls down.

When the contact point of the traveling wheel 4a is offset as shown in FIG. 5A, the measuring direction of the ultrasonic distance sensor 13 and a tangential line at the contact point of the traveling wheel 4a are offset from a vertical line, and when the angle of offset is large, the ultrasonic distance sensor 13 cannot measure a reflection wave and thus cannot measure the distance.

Making use of the above phenomenon, the traveling drive unit 3a is moved to the position at which the ultrasonic distance sensor 13 cannot measure the distance by, for example, rotating the traveling wheel 4a in a counterclockwise direction (or clockwise direction), and the position at which the traveling wheel 4a is rotated is recorded.

Next, the traveling drive unit 3a is moved to the position at which the ultrasonic distance sensor 13 cannot measure the distance by rotating the traveling wheel 4a in a clockwise direction (or counter-clockwise direction) which is opposite to the direction of the above procedure, and the position at which the traveling wheel 4a is rotated is recorded.

With these operations, when the traveling wheel 4a is rotated to the central position between these rotation positions, the position of the traveling drive unit 3a can be determined assuming that the processing apparatus is disposed to the position shown in FIG. 5B in its entirety.

When the traveling wheel 4a is rotated in the counterclockwise direction (or clockwise direction), if the ultrasonic distance sensor 13 cannot already measure the distance up to the inside of the pipe 2, the position at which the distance up to the inside of the pipe 2 can be measured and the position at which the distance up to the inside of the pipe 2 cannot be measured are searched by first rotating the traveling wheel 4a in the clockwise direction (or counterclockwise direction) contrary to the procedure described above, and the positions to which the traveling wheel 4a is rotated at the time are recorded.

Thus, when the traveling wheel 4a is rotated to the central position between these two rotating positions, the position of the traveling drive unit 3a can be determined assuming that the pipe inside processing apparatus 1 is disposed to the position shown in FIG. 5B in its entirety.

Further, as another method, there may be provided a method of measuring the angle between the traveling drive unit 3a and the coupling mechanism 6 or the angle between the traveling drive unit 3b and the coupling mechanism 6 by an angle sensor, not shown, and determining the position of the traveling drive unit 3a by the change in angle.

In this case, an angle θ shown in FIG. 3 is changed when the traveling wheel 4a is rotated in the two directions of the clockwise direction and the counterclockwise direction likewise the procedure described above. Thus, the positions of the traveling drive units 3a, 3b can be determined so that the contact points of the traveling wheels 4a, 4b on the inside of the pipe are point-symmetrical with respect to the projection plane which is approximately orthogonal to the center axis of the pipe in the longitudinal direction of the pipe by making use that the angle θ between the traveling drive unit 3a and the coupling mechanism 6 or the angle θ between the traveling drive unit 3b and the coupling mechanism 6 is maximized in the state of FIG. 5B.

When the initial position of the pipe inside processing apparatus 1 is determined as described above, the rotating operation of the processing apparatus 1 can be stabilized in its entirety, and the processing apparatus 1 can be moved while causing the working device 5 to properly face the inside of the pipe 2.

Next, there will be explained a device for specifying a position of the working device 5 to the pipe 2 in the circumferential direction and a device for stabilizing the rotation axis of the inside of pipe processing apparatus 1 about the center axis of the pipe 2 in the longitudinal direction thereof.

When, for example, a rotation roller and a rotation sensor, both not show, for detecting the rotation angle of the rotation roller are disposed to each of the traveling drive units 3a, 3b, and the processing apparatus 1 is installed in the pipe 2, the rotation rollers come into contact with the inside of the pipe 2 and are rotated by the rotating operation of the processing apparatus 1. Then, when the traveling drive units 3a, 3b are moved in the circumferential direction by rotating the traveling wheels 4a, 4b, the rotation angles of the rotation rollers are detected by the rotation sensors.

With this operation, the rotation angle of the pipe inside processing apparatus 1 with respect to the pipe 2 can be determined from the rotation angles detected by the rotation sensors, and accordingly, the amount of movement of the working device 5 in the circumferential direction with respect to the pipe 2 can be specified.

Further, the processing apparatus 1 can be stably rotated about the center axis of the pipe 2 in the longitudinal direction thereof by adjusting the difference between the rotation speeds of the traveling wheels 4a, 4b so that the difference between the rotation angles detected by the rotation sensors disposed to the traveling drive units 3a, 3b is reduced.

The operation for adjusting the rotation axis can be also performed by disposing the rotation roller and the rotation sensor to any one of the traveling drive units 3a, 3b and disposing an inclination sensor, not shown, to another one of them (all the rotation roller, the rotation sensor, and the inclination sensor may be disposed to any one of the traveling drive units. The rotation roller and the rotation sensor may be disposed to one of the traveling drive units, and the inclination sensor may be disposed to the other traveling drive unit).

That is, the pipe inside processing apparatus 1 can be stably rotated about the center axis of the pipe 2 in the longitudinal direction by adjusting the attitude thereof. Further, the position of the working device 5 in the circumferential direction can be specified by the rotation roller and the rotation sensor by determining the inclination angle of the processing apparatus 1 by the inclination of the inclination sensor and adjusting the difference between the rotation speeds of the traveling wheels 4a, 4b so that the inclination angle is reduced.

Next, an operation/working effect of the pipe inside processing apparatus 1 will be explained.

According to the first embodiment described above, it is possible to insert and install the pipe inside processing apparatus into and to the pipe 2 from the opening between the nozzle 31 and the throat 32 of the inlet mixer 33 without removing the inlet mixer 33 of the jet pump 3 shown in FIG. 4 to thereby inspect the inside of the pipe 2. At the time, the following effects can be obtained.

First, since the vertical component of the weight under water of the pipe inside processing apparatus 1 supported by the suspension device 8a, the processing apparatus 1 does not fall. Furthermore, since a degree of freedom of active drive necessary to install the processing apparatus 1 is only two degrees of freedom (only the degree of freedom of rotation about the axis of each of the rotation support mechanisms of the respective traveling drive units), the working device 5 can be accurately moved in the circumferential direction by a small number of degree of freedom of drive while keeping a predetermined distance along the inside surface of the pipe 2.

Second, since the initial position of the processing apparatus 1 in the pipe 2 is determined only by the lifting and lowering operation of the suspension device 8b, the pipe inside processing apparatus 1 can be correctly and securely positioned while directly comparing the working device 5 with the welding line on the inside of the pipe 2.

Third, in an emergency of the pipe inside processing apparatus 1, a rotational motion force is generated about the axes of the rotation support mechanisms 9a, 9b by the weight under water of the processing apparatus 1 by pulling only the suspension device 8a upward and the inside of pipe processing apparatus 1 is thereby naturally made straight in its entirety. As a result, since the pipe processing apparatus 1 is placed in a position ready for collection, it can be collected almost at any time, and a risk of damaging the nozzle and the throat of the jet pump can be reduced.

According to the first embodiment, there can be provided the apparatus 1 for processing the inside of the pipe 2, which can be moved accurately in the circumferential direction along the inside of the pipe while keeping a predetermined distance in the inspection and the examination of the inside of the jet pump performed without removing the inlet mixer of the jet pump and can be collected easily in an emergency regardless of its simple arrangement and structure, and the processing apparatus 1 has a small risk of damaging the nozzle and the throat of the jet pump.

Second Embodiment

A second embodiment of the present invention will be explained hereunder with reference to FIGS. 6 and 7.

It is to be noted that, in the second embodiment, the same arrangements and structural elements as those of the first embodiment are denoted by the same reference numerals, and duplicated explanation is omitted herein.

Figure 6A:
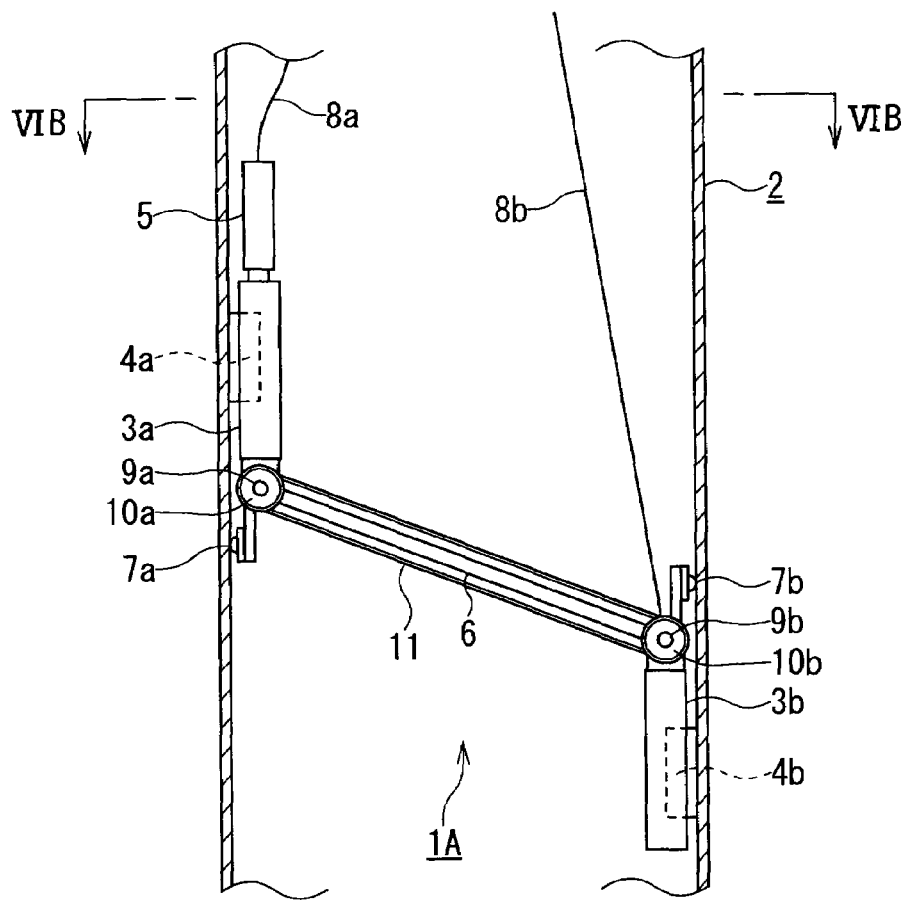
FIG. 6A and FIG. 6B are a plan view and a longitudinal sectional view showing arrangement and shape of a second embodiment of the pipe inside processing apparatus according to the present invention.
Figure 6B:
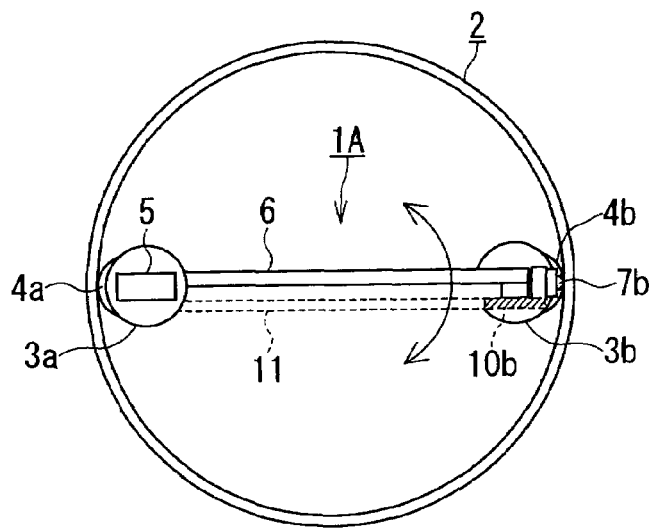

FIG. 6A and FIG. 6B are front elevational view and plan view showing arrangement and shape of the pipe inside processing apparatus of the second embodiment according to the present invention.

As shown in FIG. 6A, the apparatus 1A for processing inside of pipe (pipe inside processing apparatus 1A) of the embodiment includes: a timing pulley 10a, which is fixed to a rotation support mechanism 9a; a timing pulley 10b, which is fixed to a rotation support mechanism 9b; and a timing belt 11, which connects the timing pulley 10a to the timing pulley 10b.

The timing pulleys 10a and 10b have the same shape.

Figure 7:
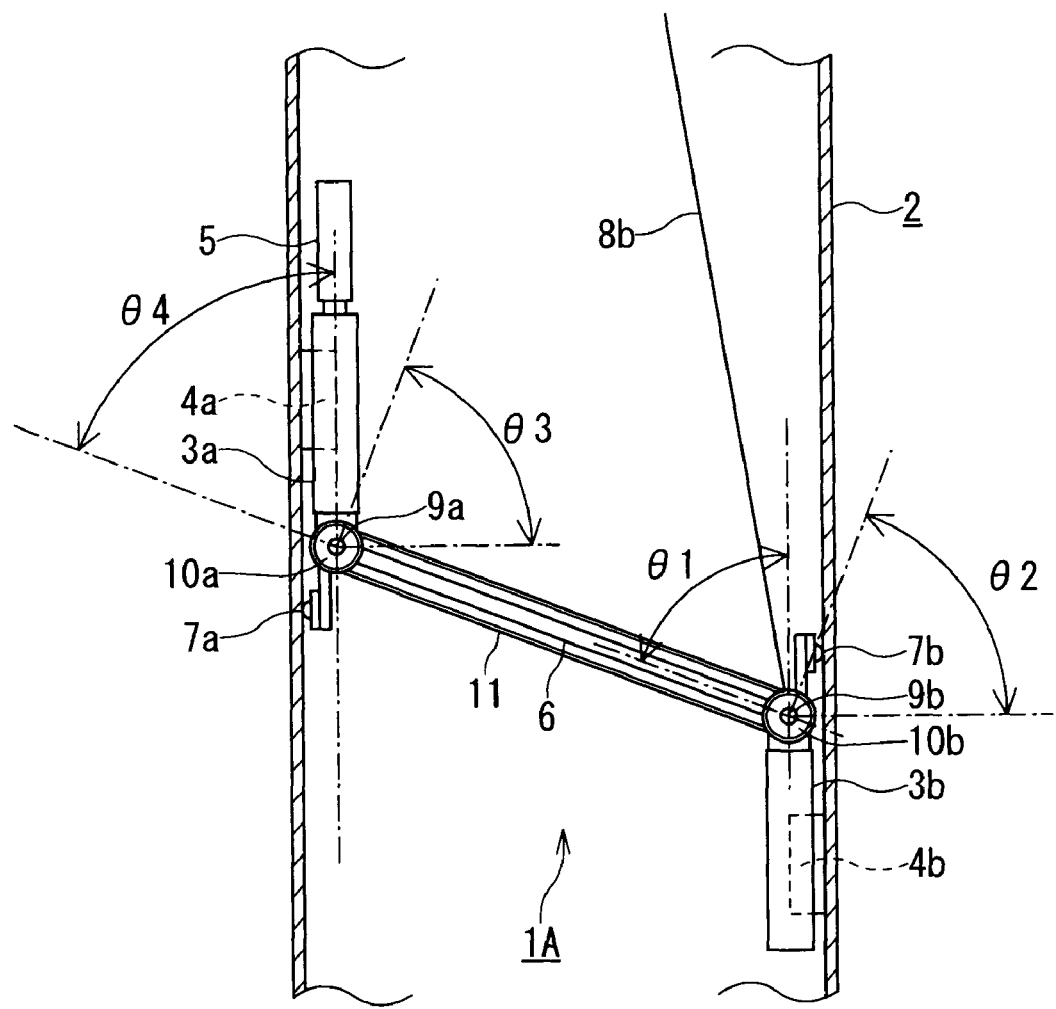
FIG. 7 is a conceptual view showing an operating state of the pipe inside processing apparatus of the second embodiment according to the present invention.

In FIG. 7, the angle, at which the timing pulley 10b winds the timing belt 11, is shown by $\theta 2$ at the time the angle between a coupling mechanism 6 and a vertical direction is set to $\theta 1$, $\theta 2=\theta 1$ is established. When the angle at which the timing pulley 10a is rotated by the wounded timing belt 11 shown by $\theta 3$, $\theta 3=\theta 2$ is established. When the rotation angle of the traveling drive unit 3a which fixes the timing pulley 10a is shown by $\theta 4$, since $\theta 4=\theta 3$, $\theta 4=\theta 1$ is established at all times.

Accordingly, in the pipe inside processing apparatus 1A of the second embodiment according to the present invention, the relative positions of traveling drive units 3a, 3b are in parallel with each other at all times.

Next, an operation/working effect of the pipe inside processing apparatus 1A will be explained.

When the processing apparatus 1A is installed, there is a fear that the traveling drive unit 3a is inclined by the rigidity of a measurement cable, a control cable, and the like attached to the coupling mechanism 6.

According to the pipe inside processing apparatus 1A of the second embodiment, since the traveling drive units 3a, 3b are always in parallel with each other as well as the rotation axes of traveling wheels 4a, 4b are also in parallel with each other, the traveling wheels 4a, 4b can be securely pressed against and come into contact with an inside of a pipe, and a desired grounding force can be obtained.

Third Embodiment

A third embodiment according to the present invention will be explained hereunder with reference to FIGS. 8A and 8B.

Figure 8A:
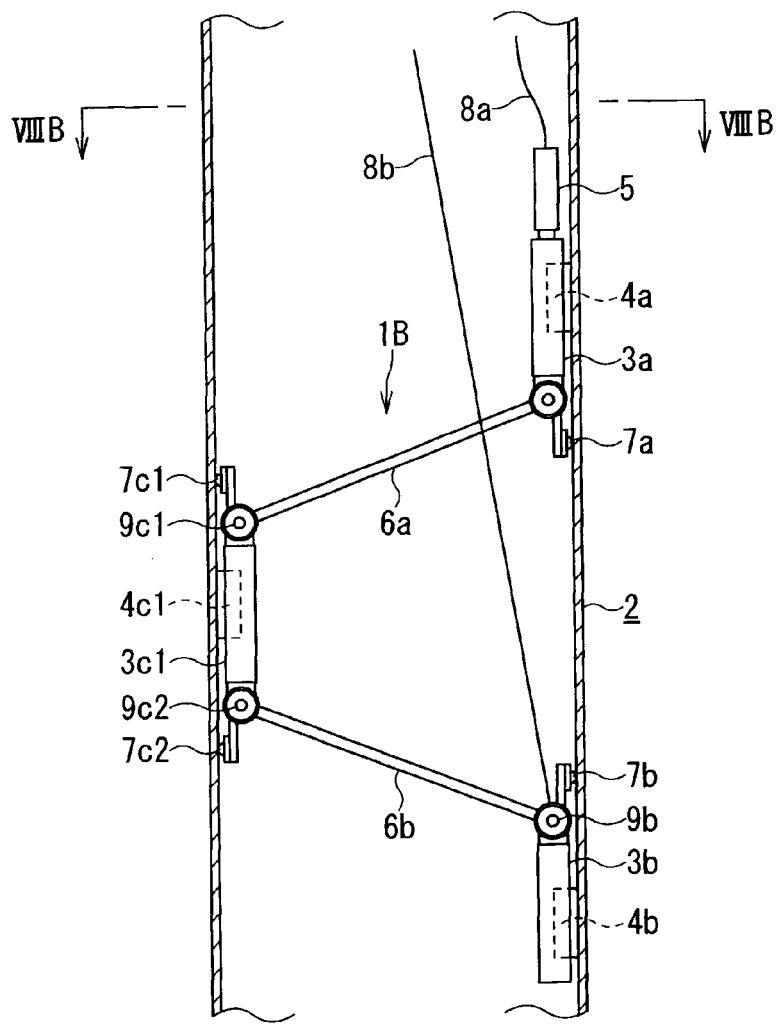
FIG. 8A and FIG. 8B are a plan view and a longitudinal sectional view showing arrangement and shape of a third embodiment of the pipe inside processing apparatus according to the present invention.
Figure 8B:
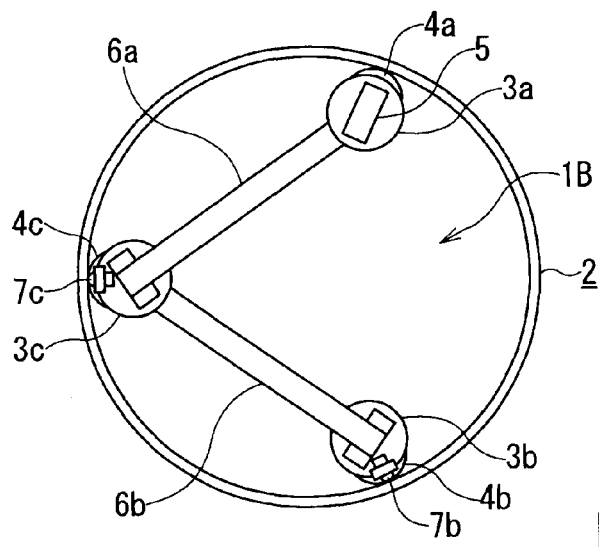

FIG. 8A and FIG. 8B are a front elevational view and a plan view showing arrangement and shape of a pipe inside processing apparatus 1B of the third embodiment according to the present invention.

In the third embodiment, the same elements or arrangements as those of the first embodiment are denoted by adding the same reference numerals, and duplicated explanation is omitted herein.

As shown in FIG. 8A, the pipe inside processing apparatus 1B of the present embodiment includes: traveling drive units 1B, 3b, 3c, which have traveling wheels 4a, 4b, 4c, respectively, to be movable in a circumferential direction on an inside of a vertical pipe 2; a working device 5, which is disposed to the traveling drive unit 3a; a rotation support mechanism 9a, which is disposed to the traveling drive unit 3a so that the attachment angle thereof is adjusted; a rotation support mechanism 9b, which is disposed to the traveling drive units 3b so that the attachment angle thereof is adjusted; rotation support mechanisms 9c1 and 9c2, which are disposed to the traveling drive units 3c so that the attachment angles thereof are adjusted; a coupling mechanism 6a, which swingably couples the traveling drive unit 3a and 3c respectively through the rotation support mechanism 9a, 9c1; a coupling mechanism 6b which swingably couples the traveling drive units 3b, 3c, respectively, through the rotation support mechanisms 9b, 9c2; a suspension device 8a, which is connected to one of the traveling drive unit 3a or the working device 5; a suspension device 8b, which is connected to one of the traveling drive units 3b or the rotation support mechanism 9b; an idler roller ball 7a, which is fixed to the traveling drive unit 3a; an idler roller ball 7b, which is fixed to the traveling drive units 3b; and idler roller balls 7c1, 7c2 which are fixed to the traveling drive units 3c.

The rotation axes of the traveling wheels 4a, 4b, 4c are approximately in parallel with the center axis of the pipe in the longitudinal direction thereof.

The rotation axes of the rotation support mechanisms 9a, 9b, 9c1, 9c2 are approximately in parallel with a plane which is approximately orthogonal to the center axis of the pipe in the longitudinal direction thereof.

The inner product of the unit vector of the traveling wheels 4a, 4b, 4c in the rotation axis direction thereof and the inner product of the unit vector of the rotation support mechanisms 9a, 9b, 9c1, and 9c2 in the rotation axis direction are set to "0".

The pressure force of the idler roller balls 7a and 7b is balanced with the horizontal force acting on the rotation support mechanisms 9a, 9b and the couple of the traveling drive units 3a, 3b generated by the ground contact force of the traveling wheels 4a and 4b.

Accordingly, when the rotation support mechanisms 9a, 9b disposed to the traveling drive units 3a, 3b are set to the positions where the couple of the traveling drive units 3a, 3b is not generated, it is not necessary to locate the idler roller balls 7a, 7b.

The pressure force of the idler roller balls 7c1, 7c2 is balanced with the horizontal force acting on the rotation support mechanisms 9c1, 9c2 and the couple of the traveling drive unit 3c generated by the ground contact force of the traveling wheel 4c.

Accordingly, the idler roller balls 7a and 7b are not necessary by setting the rotation support mechanisms 9c1, 9c2 disposed to the traveling drive unit 3c to the position where the torque of the traveling drive units 3c is not generated.

Further, the working device 5 may be attached to the traveling drive unit 3c other than the traveling drive unit 3a.

The traveling drive units 3a, 3b, 3c, the rotation support mechanisms 9a, 9b, 9c1, 9c2, the suspension devices 8a and 8b, and the idler roller balls 7a, 7b, 7c1, 7c2 have the same structure, respectively, so that the upper side and the lower side of the pipe inside processing apparatus 1B may be inverted upside down.

As shown in FIG. 8B, the rotation support mechanisms 9a, 9b, 9c1, and 9c2 are disposed to and held by the traveling drive units 3a, 3b, 3c by adjusting the attachment angles thereof so that the angles between the traveling wheels 4a, 4c and the contact points on the inside of the pipe thereof using the center of axis of the pipe in the longitudinal direction thereof on a projection plane, which is approximately orthogonal to the center axis of the pipe in the longer direction thereof, as an apex and the angles between the traveling wheels 4b, 4c and the contact points on the inside of the pipe thereof using the center axis of the pipe in the longitudinal direction thereof on the projection plane, which is orthogonal to the center axis of the pipe in the longitudinal direction thereof, as an apex, are set to 120°, respectively.

As a result, since the rotation axes of the coupling mechanisms 6a, 6b are set to 60°, the contact points of the traveling wheels 4a, 4b, 4c can be disposed in a regular triangle shape on the projection plane, which is approximately orthogonal to the center axis of the pipe in the longitudinal direction thereof.

The lengths of the coupling mechanisms 6a, 6b are set so that the relative distances between the traveling wheels 4a, 4b, 4c at the contact points on the inside of the pipe are longer than the length of one side of the regular triangle.

As already explained herein with reference to FIG. 2, when the pipe inside processing apparatus 1B is developed in the inside of the vertical pipe 2, the vertical component of the weight under water of the processing apparatus 1B rests by being supported by the suspension device 8b.

As a result, the traveling wheels 4a, 4b, 4c are pressed against the inside of the pipe likewise the installation procedure and the operation explained with reference to FIG. 2 of the first embodiment.

When the traveling wheels 4a, 4b, 4c are driven in rotation in this state, the traveling drive units 3a, 3b, 3c are moved in the circumferential direction on the inside of the pipe. That is, since the pipe inside processing apparatus 1B is rotated using the center axis of the pipe 2 in the longitudinal direction as a center of rotation, the working device 5 is moved in the circumferential direction on the inside of the pipe.

When the angles between the traveling wheels 4a and 4c and the contact points on the inside of the pipe, which use the center axis of the pipe in the longitudinal direction on the projection plane, which is approximately orthogonal to the center axis of the pipe in the longitudinal direction thereof, as the apex, and the angles between the traveling wheels 4b, 4c and the contact points on the inside of the pipe thereof, which use the center axis of the pipe in the longitudinal direction thereof on the projection plane, which is approximately orthogonal to the center axis of the pipe in the longitudinal direction thereof, as the apex, are within the range of 90° or more to 180° or less. Further, since the processing apparatus 1B can be installed in the vertical pipe 2, and the grounding forces of the traveling wheel 4a, 4b, 4c can be obtained, the pipe inside processing apparatus 1B can be rotated.

Further, likewise the first embodiment, the pipe inside processing apparatus 1B may be provided with functions as a rinse device, an inspection device, a protective maintenance device, and a repair device by replacing an inspection sensor 5, or the processing apparatus 1B dedicated for various types of works (rinse, inspection, examination, protective maintenance, repairing) may be separately prepared.

Next, an operation and working effects or functions of the pipe inside processing apparatus 1B will be explained.

According to the third embodiment described above, since the three sets of the traveling drive units are disposed and the traveling wheels are disposed at the three positions at the same angle, the rotation axis of the processing apparatus 1B can be easily caused to accord with the center axis of the pipe in the longitudinal direction thereof. Thus, the installation accuracy of the working device 5 can be improved, and a stable rotating operation can be realized.

Further, when the grounding points of the traveling wheels are disposed on the inside of the pipe at the same angle on the projection plane, which is approximately orthogonal to the center axis of the pipe in the longitudinal direction thereof, the rotation axis of the processing apparatus 1B can be easily caused to accord with the center axis of the pipe in the longitudinal direction. Thus, the installation accuracy of the working device 5 can be improved, and a stable rotating operation can be realized.

It is further to be noted that even in a case where an arrangement in which four or more traveling drive units are coupled with each other through coupling mechanisms, substantially the same effect and operation as those of the third embodiment can be also obtained. At the time, the length of each of the coupling mechanisms is set such that the polygonal shape drawn on the projection plane, which is approximately orthogonal to the center axis of the pipe in the longitudinal direction thereof, by the contact points on the inside of the pipe of the respective traveling drive units, includes the center point of the pipe on the projection plane.

That is, when the arrangement, in which three or more traveling drive units are coupled with each other by the coupling mechanisms, is viewed from the upper side of the pipe, the center point of the pipe is included in the polygonal shape on the plane drawn by the contact points of the inside of the pipe of the respective traveling drive units coupled with each other by the coupling mechanisms. In, for example, in an arrangement, in which four traveling drive units are coupled with each other by coupling mechanisms, the center point of the pipe is included in a square shape on a plane when viewed from above the pipe. The working device becomes movable in the circumferential direction along the inside of the horizontal pipe by these traveling drive units.

Fourth Embodiment

Hereunder, a fourth embodiment will be explained with reference to FIGS. 9A and 9B.

It is first to be noted that, in the fourth embodiment, the same arrangements as those of the third embodiment are denoted by adding the same reference numerals, and duplicated explanation is omitted herein.

Figure 9A:
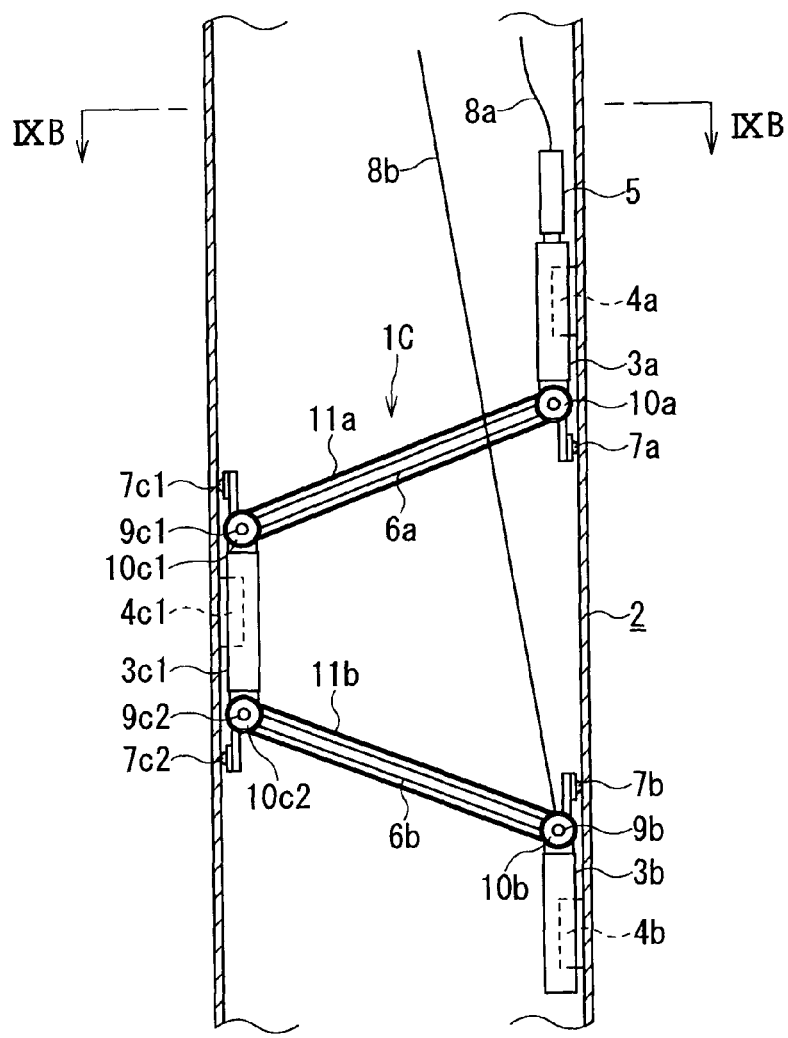
FIG. 9A and FIG. 9B are a plan view and a longitudinal sectional view showing arrangement and shape of a fourth embodiment of the pipe inside processing apparatus according to the present invention.
Figure 9B:
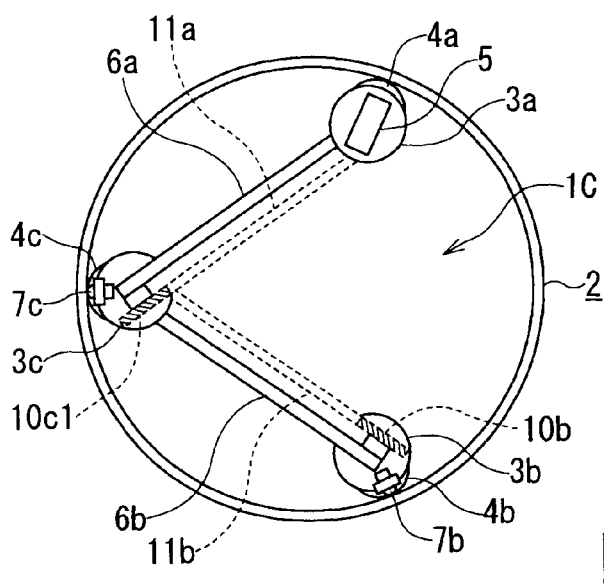

FIG. 9A and FIG. 9B are a front elevational view and a plan view showing arrangement and shape of a pipe inside processing apparatus 1C of the fourth embodiment according to the present invention.

As shown in FIG. 9A, the pipe inside processing apparatus 1C of the present embodiment includes: a timing pulley 10a, which is fixed to a rotation support mechanism 9a; a timing pulley 10b, which is fixed to a rotation support mechanism 9b; timing pulleys 10c1, 10c2, which are fixed to rotation support mechanisms 9c1 and 9c2, respectively; a timing belt 11a, which connects the timing pulley 10a to the timing pulley 10c1; and a timing belt 11b, which connects the timing pulley 10b to the timing pulley 10c2.

The timing pulleys 10a, 10b, 10c1, 10c2 are pulleys having the same structure.

With this arrangement, the relative positions of the traveling drive units 4a, 4b, 4c are in parallel with each other at all the times likewise the second embodiment.

When the processing apparatus 1C is installed, there may be a fear that the traveling drive units 3a, 3c are inclined by the rigidity of a measurement cable, a control cable, and the like attached to the coupling mechanisms 6a, 6b. According to the fourth embodiment of the present invention, since the traveling drive units 3a, 3b, 3c are always in parallel with each other as well as the rotation axes of the traveling wheels 4a, 4b, 4c, a grounding force can be obtained by securely pressing the traveling wheels 4a, 4b against the inside of the pipe.

Next, an operation and working effect of the pipe inside processing apparatus 1C will be explained.

When the processing apparatus 1C is installed, there is a fear that the traveling drive units 3a, 3c are inclined by the rigidity of a measurement cable, a control cable, and the like attached to the coupling mechanisms 6a, 6b. According to the fourth embodiment, since the traveling drive units 3a, 3b, 3c are always in parallel with each other as well as the rotation axes of the traveling wheels 4a, 4b, 4c, a desired grounding force is obtained by securely pressing the traveling wheels 4a, 4b against the inside of the pipe.

Fifth Embodiment

A fifth embodiment will be explained hereunder with reference to FIG. 10A to FIG. 10C.

In the fifth embodiment, the same arrangements as those of the third embodiment are denoted by adding the same reference numerals, and duplicated explanation is omitted herein.

Figure 10A:
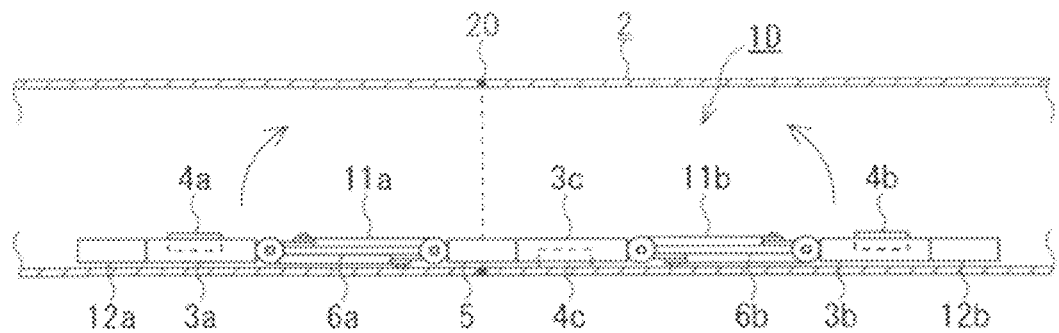
FIG. 10A, FIG. 10B, and FIG. 10C are a longitudinal sectional view observed from a front surface, a longitudinal sectional view observed from an upper surface, a sectional view observed from an upper surface showing arrangement and operation method of a fifth embodiment of the pipe inside processing apparatus according to the present invention, respectively.
Figure 10B:
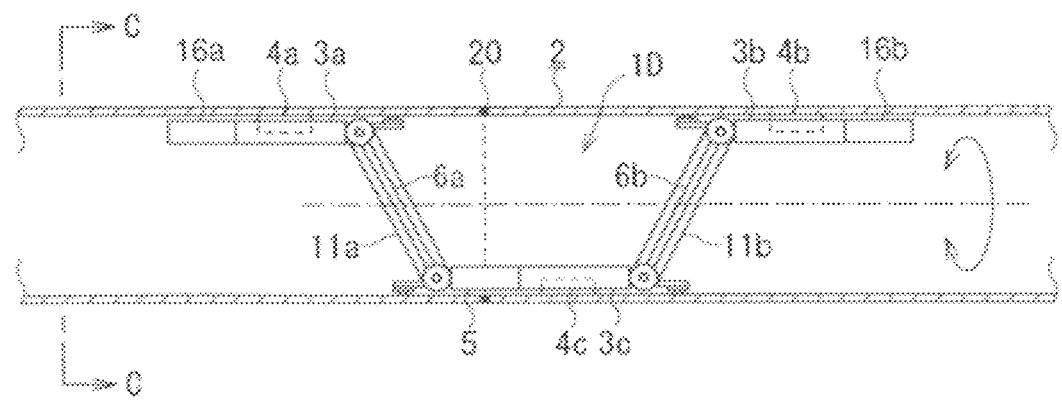
Figure 10C:
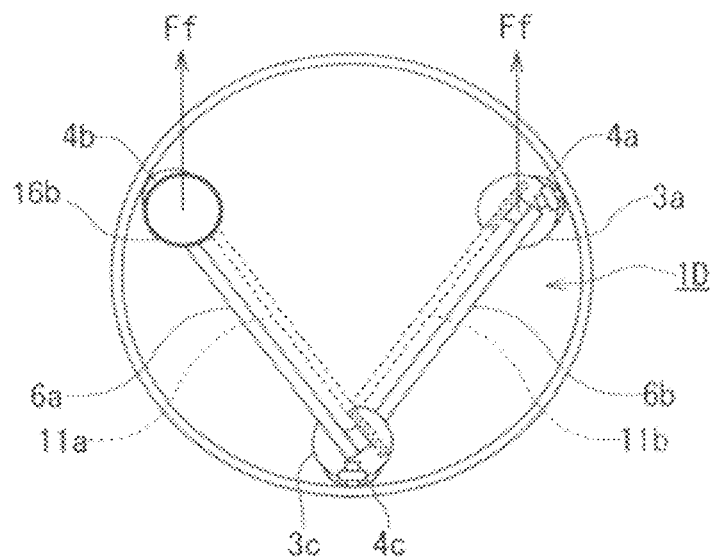

FIGS. 10A to 10C are conceptual views showing arrangement and operation method of a pipe inside processing apparatus 1D of the fifth embodiment.

As shown in FIG. 10A, the processing apparatus 1D of the embodiment includes: traveling drive units 3a, 3b, 3c, which have traveling wheels 4a, 4b, 4c, respectively, moving in a circumferential direction on an inside of a pipe (horizontal pipe) installed such that the center axis thereof faces in an approximately horizontal direction; a working device 5, which is disposed to the traveling drive unit 3c; a rotation support mechanism 9a, which is disposed to the traveling drive unit 3a so that the attachment angle thereof is adjustable; a rotation support mechanism 9b, which is disposed to the traveling drive unit 3b so that the attachment angle thereof is adjustable; rotation support mechanisms 9c1, 9c2, which are disposed to the traveling drive units 3c so that the attachment angles thereof are adjustable; a coupling mechanism 6a, which couples the traveling drive units 3a and 3c so as to be swung through the rotation support mechanisms 9a, 9c1, respectively; a coupling mechanism 6b, which couples the traveling drive units 3b, 3c so as to be swung through the rotation support mechanisms 9b, 9c2, respectively; an idler roller ball 7a, which is fixed to the traveling drive unit 3a; an idler roller ball 7b, which is fixed to the traveling drive units 3b; idler roller balls 7c1, 7c2, which are fixed to the traveling drive units 3c; a timing pulley 10a, which is fixed to the rotation support mechanism 9a; a timing pulley 10b, which is fixed to the rotation support mechanism 9b; timing pulleys 10c1, 10c2, which are fixed to the rotation support mechanisms 9c1, 9c2, respectively; a timing belt 11a, which connects the timing pulley 10a to the timing pulley 10c; a timing belt 11b, which connects the timing pulley 10b to the timing pulley 10c2; floats 16a and 16b, which are disposed to the traveling drive units 3a, 3b; and an actuator, not shown, or a motor, not shown, which drives the coupling mechanisms 6a, 6b disposed to the traveling drive units 3a, 3b, 3c.

Further, the working device 5 may be attached to the traveling drive unit 3b or 3c other than the traveling drive unit 3a.

Furthermore, the traveling drive units 3a, 3b, 3c, the rotation support mechanisms 9a, 9b, 9c1, 9c2, the idler roller balls 7a, 7b, 7c1, 7c2, the timing pulleys 10a, 10b, 10c1, 10c2, and the timing belts 11a, 11b have the same structure, respectively, so that the pipe inside processing apparatus 1D is arranged similarly on the right side and the left side thereof.

Hereunder, an arrangement, in which the inside of pipe processing apparatus 1D arranged as described above is applied to an inside of a pipe 2 installed under water in a horizontal direction, will be explained.

As shown in FIG. 10A, the pipe inside processing apparatus 1D is positioned so as to be located at a position where the working device 5 can inspect a welding line 20 in a state that the pipe processing apparatus 1D is made straight in its entirety in the horizontal pipe 2.

As shown in FIG. 10B, the rotation support mechanisms 9a, 9b, 9c1, and 9c2 are disposed to and held by the traveling drive units 3a, 3b, 3c by adjusting the attachment angles thereof so that the angles between the traveling wheels 4a and 4c and the contact points on the inside of the pipe thereof using the center of axis of the pipe in the longitudinal direction on a projection plane, which is approximately orthogonal to the center axis of the pipe in the longitudinal direction thereof, as an apex, are set to 120°, respectively.

As a result, since the rotation axes of the coupling mechanisms 6a, 6b are set to 60°, the contact points of the traveling wheels 4a, 4b, 4c can be disposed in a regular triangle shape on the projection plane, which is approximately orthogonal to the center axis of the pipe in the longitudinal direction thereof.

The lengths of the coupling mechanisms 6a, 6b are set so that the relative distances between the traveling wheels 4a, 4b, 4c at the contact points on the inside of the pipe thereof are longer than the length of one side of the regular triangle.

In the embodiment, the processing apparatus 1D is developed in the horizontal pipe by causing the traveling wheels 4a, 4b to come into contact with the inside of the pipe by swingably driving the coupling mechanisms 6a, 6b by means of actuator or the motor.

As shown in FIG. 10C, the pipe inside processing apparatus 1D can be prevented from falling down when the coupling mechanisms 6a, 6b are swingably driven in addition that the three traveling wheels 4a, 4b, 4c can be disposed on the inside of the pipe so that the working device 5 is not offset from a welding line 20 by reducing the weight under water of the traveling drive units 3a, 3b by the buoyancy Ff of the floats 16 shown by arrows. Further, the three traveling wheels 4a, 4b, 4c can be disposed on the inside of the pipe without the floats 16.

The angles between the traveling wheels 4a and 4c and the contact points on the inside of the pipe thereof, which use the center axis of the pipe in the longer direction thereof on the projection plane, which is approximately orthogonal to the center axis of the pipe in the longitudinal direction thereof, as the apex, and the angles between the traveling wheels 4b and 4c and the contact points on the inside of the pipe thereof, which use the center axis of the pipe in the longitudinal direction thereof on the projection plane, which is approximately orthogonal to the center axis of the pipe in the longitudinal direction thereof, as the apex, are within the range of 90° or more to 180° or less. Further, since the inside of pipe processing apparatus 1D can be installed in the horizontal pipe 2, and the grounding forces of the traveling wheel 4a, 4b, 4c can be obtained, the processing apparatus 1D can be rotated.

Likewise the first embodiment, the pipe inside processing apparatus 1D may be provided with functions as a rinse device, an inspection device, a protective maintenance device, and a repair device by replacing an inspection sensor 5, or an pipe inside processing apparatus 1D dedicated for various types of works (rinse, inspection, examination, protective maintenance, repairing) may be separately prepared.

According to the fifth embodiment described above, since the three sets of the traveling drive units 3a, 3b, 3c are disposed and the traveling wheels are disposed at the three positions at the same angle, the rotation axis of the processing apparatus 1D can be easily caused to accord with the center axis of the pipe in the longitudinal direction. Thus, the installation accuracy of the working device 5 can be improved, and a stable rotating operation can be realized.

Further, when the grounding points of the traveling wheels are disposed on the inside of the pipe at the same angle on the projection plane, which is approximately orthogonal to the center axis of the pipe in the longitudinal direction thereof, the rotation axis of the pipe inside processing apparatus 1D can be easily caused to accord with the center axis of the pipe in the longitudinal direction. The installation accuracy of the working device 5 can be thereby improved, and a stable rotating operation can be realized.

Further, the same effects and operations or functions as those of the third embodiment may be also obtained by an arrangement in which four or more traveling drive units are coupled with each other through coupling mechanisms. At the time, the length of each of the coupling mechanisms is set such that the polygonal shape drawn on the projection plane, which is approximately orthogonal to the center axis of the pipe in the longitudinal direction thereof, by the contact points on the inside of the pipe of the respective traveling drive units, includes the center point of the pipe on the projection plane.

Sixth Embodiment

A sixth embodiment will be explained hereunder.

Further, it is to be noted that, in the sixth embodiment, the same arrangements or structures as those of the first to the fourth embodiments are denoted by adding the same reference numerals, and duplicated explanation is omitted herein.

In the first to fourth embodiments, the suspension devices 8a and 8b of the pipe inside processing apparatuses (1, 1A to 1C) are attached passing through air tubes 18a and 18b.

This will be typically explained in connection with the first embodiment. As explained in FIG. 2, in the first embodiment, when the pipe inside processing apparatus 1 is developed in the pipe, the suspension device 8a is in a loosened state. When the processing apparatus 1 is removed, the suspension device 8a is pulled up, and the suspension device 8b is thus loosened. There is a fear that the loosened suspension device 8a interferes with the pipe inside processing apparatus 1, is jammed by the nozzle 31 of the jet pump 30 when the processing apparatus 1 is pulled up from between the nozzle 31 and the throat 32 of the jet pump 30, and scratches the surfaces of the nozzle 31 and the throat 32.

However, when the suspension devices 8a and 8b of the processing apparatus (1, 1A to 1C) are passed through the air tubes as in the embodiment, the suspension devices 8a and 8b are not extremely loosened and further the air tubes act as protection tubes.

Next, an operation and working effect of the pipe inside processing apparatus (1, 1A to 1C) will be explained.

According to the sixth embodiment, the pipe inside processing apparatus (1, 1A to 1C) can be securely collected from the inside of the jet pump while preventing the suspension devices 8a and 8b from being jammed by the nozzle 31 of the jet pump 30 and further preventing the suspension devices 8a and 8b from scratching the surfaces of the nozzle 31 and the throat 32.

Although the pipe inside processing apparatus (1, 1A to 1C) shown in the first to the sixth embodiment are explained with reference to the case in which the processing apparatus y are used to inspection and examination works under water as an example, the same operation and working effect can be obtained even if the working devices for performing inspection and examination are replaced with other working devices for performing rinse, protective maintenance and repair. That is, the same operation and working effect can be obtained even if the working device is a rinsing device such as a brush, a polishing jig, a water rinsing nozzle, and the like, a protective maintenance device such as a water jet peening head, a laser peening head, and the like, or a repair device such as a welding head, a grinding jig, and the like.

Further, it is to be noted that the present invention is not limited to the described embodiments and many other changes and modifications may be made without departing from the scopes of the appended claims.

It is further to be noted that the vertical pipe and the horizontal pipe, which are referred to with reference to the above embodiments, are used to exemplarily explain the relative positional relationship between the center axis of the pipe and the apparatus for processing the inside of pipe (1, 1A to 1C) clearly. Thus, when the pipe is actually installed, the center axis of the pipe need not be necessarily horizontal or vertical. Even if a pipe, which inclines from a horizontal or vertical direction and a pipe, having a somewhat complex shape with a changing inner diameter, may also exhibit the operation and working effect described above.

What is claimed is:

1. An apparatus for processing an inside of a vertical pipe, comprising:
   two traveling drive units having a traveling wheel which is configured to be movable in a circumferential direction of the pipe in contact with the inside of the pipe;
   a working device disposed to at least one of the traveling drive units for processing an inside of pipe;
   a rotation support mechanism rotatably disposed to each of the traveling drive units;
   a coupling mechanism for swingably coupling the two traveling drive units, respectively, through the rotation support mechanism, the coupling mechanism having such a length that a relative distance between the contact points of the two traveling drive units is larger than the inner diameter of the vertical pipe; and
   two suspension devices connected to the rotation support mechanism of one of the traveling drive units and to the rotation support mechanism of the other of the traveling drive units,
   wherein the two traveling drive units are inserted into the inside of the pipe, and the working device is moved along the inside of the pipe by the two traveling drive units.

2. An apparatus for processing an inside of a vertical pipe, comprising:
   three or more traveling drive units having a traveling wheel which is configured to be movable in a circumferential direction of the pipe in contact with the inside of the pipe;
   a working device disposed to at least one of the traveling drive units for processing the inside of the pipe;
   a rotation support mechanism rotatably disposed to each of the traveling drive units;
   a coupling mechanism for swingably coupling the traveling drive units through the rotation support mechanism and connecting all the traveling drive units; and
   a suspension device connected to the rotation support mechanism disposed to the traveling drive unit located at one end and to the rotation support mechanism disposed to the traveling drive unit located at another end of the traveling drive units coupled by the coupling mechanism,
   wherein the coupling mechanism has a length set such that a polygonal shape, which is drawn on a projection plane approximately orthogonal to the center axis of the pipe in the longitudinal direction thereof by the contact point, which is located on the inside of the pipe, of the traveling drive unit includes a center point of the pipe on the projection plane; and
   the traveling drive units are inserted into the inside of the pipe, and the working device is moved along the inside of the vertical pipe by the traveling drive units.

3. The pipe inside processing apparatus according to claim 1 or 2, further comprising timing pulleys disposed to each rotation support mechanism and timing belts trained around the timing pulleys disposed in confrontation with each other through the coupling mechanism, wherein the processing apparatus is developed while keeping relative attitudes of the traveling drive units making use that when the coupling mechanism is rotated around one of the centers of the timing pulleys, a self-rotation angle of the other timing pulley is made equal to the rotation angle of the coupling mechanism, and the coupling mechanism has one end connected to the rotation support mechanism of one of the traveling units and another end connected to the rotation support mechanism of another one of the traveling units.

4. The pipe inside processing apparatus according to claim 1 or 2, wherein the suspension devices are passed through tubes.

5. The pipe inside processing apparatus according to claim 1 or 2, wherein the suspension device includes a float having a buoyancy by being injected with air.

6. An apparatus for processing an inside of a horizontal pipe, comprising:
   three or more traveling drive units having a traveling wheel which is configured to be movable in a circumferential direction of the pipe in contact with the inside of the pipe;
   a working device disposed to at least one of the traveling drive units for performing a work;
   a rotation support mechanism rotatably disposed to each of the traveling drive units;
   a coupling mechanism for swingably coupling each of the traveling drive units through the rotation support mechanism and connecting all the traveling drive units,
   wherein the coupling mechanism has a length set such that a polygonal shape, which is drawn on a projection plane approximately orthogonal to the center axis of the pipe in a longitudinal direction thereof by the contact point, which is located on the inside of the pipe, of the traveling drive unit includes a center point of the pipe on the projection plane, and
   the working device is moved along the inside of the horizontal pipe by the traveling drive units.

7. The pipe inside processing apparatus according to according to any one of claim 1, 2 or 6, wherein the traveling drive units include floats having buoyancy by being injected with air.

8. The pipe inside processing apparatus according to any one of claim 1, 2 or 6, wherein the working device comprises an inspection sensor and includes at least one selected from a visual examination camera, a volume examination ultrasonic flaw sensor, and an eddy current flaw sensor.

9. The pipe inside processing apparatus according to any one of claim 1, 2 or 6, wherein the working device includes at least one selected from a polishing work brush, a polishing jig, and a water rinse nozzle.

10. The pipe inside processing apparatus according to any one of claim 1, 2 or 6, wherein the working device includes at least one selected from a water jet peening head and a laser peening head for performing a preventive maintenance work.

11. The pipe inside processing apparatus according to any one of claim 1, 2 or 6, wherein the working device includes at least one selected from a welding head and a grinding jig for performing a repair work.

12. A method of processing an inside of a pipe comprising:
   a preparation step of preparing the pipe inside processing apparatus according to claim 1 or 2;
   a fixing step of fixing the processing apparatus in a vicinity of a target portion of the pipe; and
   a working step of performing a work to the target portion.

13. A method of processing an inside of a pipe comprising:
   a preparation step of preparing the pipe inside processing apparatus according to claim 6;
   a fixing step of fixing the processing apparatus in a vicinity of a target portion of the pipe; and
   a working step of performing a work to the target portion,
   wherein the coupling mechanism has upper and lower end portions which are connected to the rotation support mechanisms of corresponding ones of the traveling units in a manner such that the upper one end portion is first connected and then the lower one end portion is connected in a suspended manner.

* * * * *